United States Patent Office 2,805,775
Patented Sept. 10, 1957

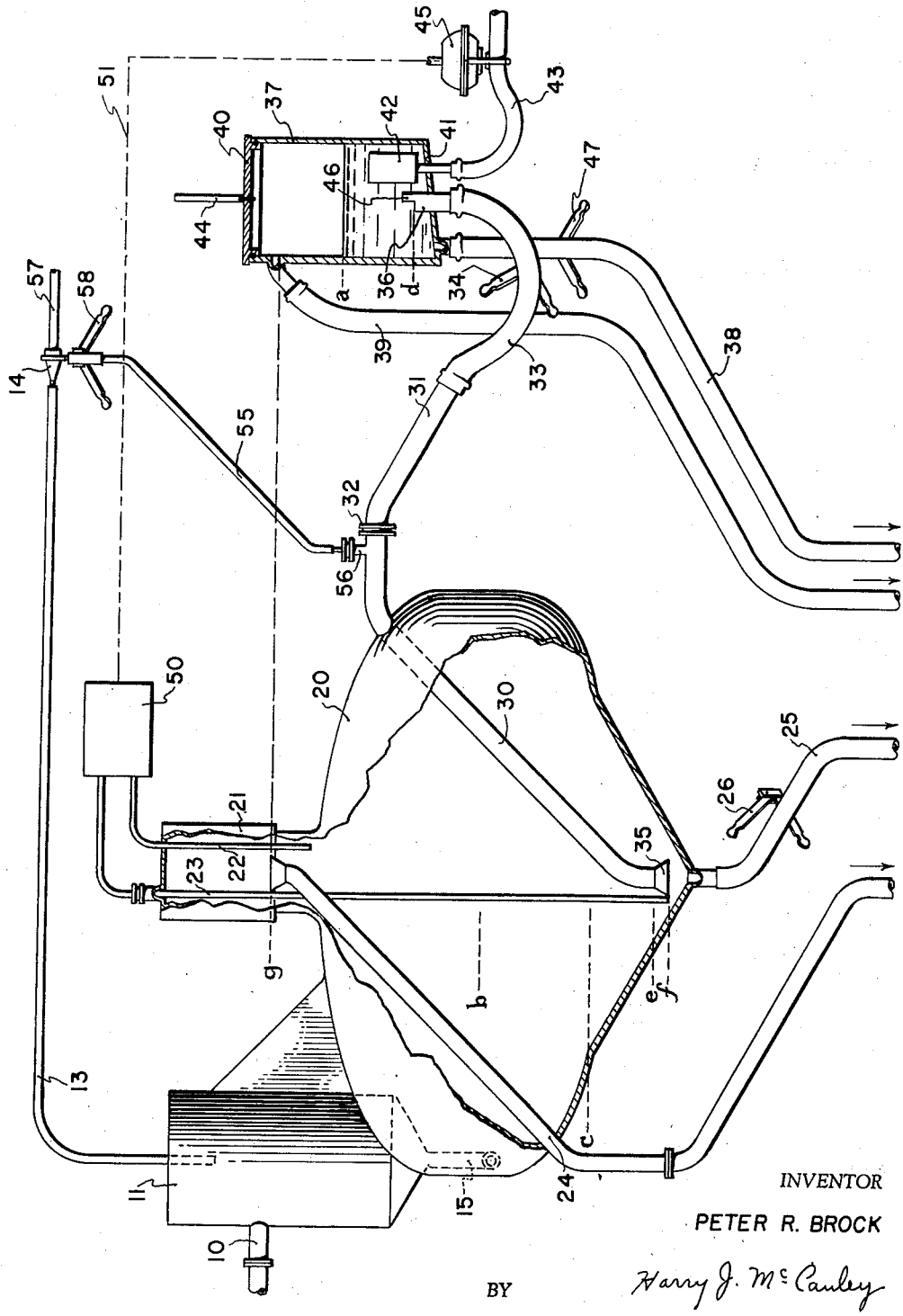

2,805,775

SIPHON DELIVERY FOR DECANTER

Peter R. Brock, Hagerstown, Md., assignor to E. I. du Pont de Nemours and Company, Wilmington, Del., a corporation of Delaware Application June 17, 1954, Serial No. 437,548

3 Claims. (Cl. 210—258)

The present invention relates generally to continuous overflow type decantation separators, and particularly to an overflow type decantation separator provided with a siphon delivery apparatus adapted to the supply of high-purity nitroglycerin in dynamite manufacturing operations.

In the conventional manufacture of nitroglycerin, the crude nitroglycerin containing some acid mixed therewith is neutralized by washing with sodium carbonate solution. The nitroglycerin is immiscible in the soda solution and can be readily separated from the wash by decantation, the nitroglycerin having a specific gravity of the order of 1.50–1.60 while the soda wash has a specific gravity in the range of about 1.00–1.10. The raw water employed in making up the soda wash is more or less hard, depending on the geographical location of the manufacturing plant, and the addition of sodium carbonate to the water precipitates finely divided solids which, in time, accumulate as objectionable deposits on the inside surfaces of the nitroglycerin supply lines and thus interfere with operations, as well as create a hazard. In addition, any dust in the air entering the system from various points increases the seriousness of the solids problem.

A primary object of this invention is to provide a decantation apparatus which is adapted to draw off substantially pure nitroglycerin from soda water in the course of continuous overflow decantation separation of the two liquids. Another object of this invention is to provide a decantation apparatus which will, under all circumstances, prevent the passage of soda water and any solids therein from the acid neutralization system into the manufacturing piping and any apparatus located past the neutralization system. Another object of this invention is to provide a decantation apparatus which is adapted to handle nitroglycerin safely. The manner in which these and other objects of this invention are accomplished will become apparent from the following description and the appended drawing, which illustrates a preferred embodiment of this invention together with associated apparatus.

In general, the apparatus of this invention comprises a continuous overflow type decantation separator adapted to separate the lightest of two immiscible liquids from the heaviest in combination with a siphon having an intake opening disposed within the decantation separator at a level below the inlet for the mixed liquids and a discharge opening in communication with a header provided for reception of the heaviest of the two liquids, the difference in elevation between the intake and discharge openings of the siphon being preselected to oppose a resistance to flow through the siphon when filled with the heaviest of the two liquids substantially greater than that of a head of the lightest of the two liquids equal to the distance between the intake opening of the siphon and the outlet opening of the decantation separator through which the separated lightest liquid is drawn off.

Referring to the drawing, nitroglycerin in mixture with soda wash is supplied to the soda water separator 20 from the acid neutralization equipment, not shown, through line 10, which discharges into a catch tank 11, provided to minimize turbulence interfering with decantation separation in the separator. It will be understood that the nitroglycerin-soda water mixture may be supplied to the separator either continuously, as in the Biazzi process, for example, or as separate batches supplied at finite intervals of time, depending upon the process of nitration which is employed.

Catch tank 11 is provided with a fresh water wash line 13 opening into the top of the tank which line is provided with an eductor 14, the purpose for which is described hereinafter in full detail. Catch tank 11 is provided with a downwardly sloped bottom which permits complete discharge of the tank's contents through line 15, opening tangentially into separator 20. The volume of separator 20 is purposely made large to provide sufficient hold-up time therein to allow the soda wash to separate as a supernatant layer over the layer of nitroglycerin, the nitroglycerin accumulating as a substantially pure heavier layer in the inverted conical bottom of the separator. As hereinabove mentioned, separator 20 is of the continuous overflow type, the soda wash escaping to waste by flow through outlet line 24 disposed with its open end at level $g$ within the dome 21 constituting the top of separator 20. Although not necessary to this invention, and not described in detail herein for that reason, it is an aid to provide means advising the operator of the existing level of nitroglycerin carried in the separator and pneumatic meter 50 is therefore provided, the meter sensing nitroglycerin level through the two air-purged dip legs 22 and 23 entering the separator through dome 21. Optionally, meter 50 may be of a type performing a control function, such as, for example, cutting off delivery of material through line 43, hereinafter described, when the level of nitroglycerin in the separator drops to some predetermined point such as, for example, level $c$. This latter control may be obtained by mounting valve 45 on line 43, the operation of valve 45 being responsive to meter 50, as indicated by the broken line connection 51. A resilient nitroglycerin discharge tube 25, fitted with a clamp valve 26, is provided at the bottom of separator 20, to permit dumping the entire contents of the separator to a fresh soda solution catch tank, not shown, if conditions, such as periodic cleaning or repairs to equipment, necessitate. Due to the greater density of the nitroglycerin, as compared to the soda wash and the solid contaminants, solid particles in the product stream float into the upper layer of soda water, the greatest concentration after prolonged operation existing at the interface, and it is highly desirable to prevent the transport of these particles as well as passage of the soda water itself to subsequent apparatus farther along the manufacturing line.

The apparatus of this invention comprises a siphon apparatus which incorporates the intake leg 30, opening at level $f$, the discharge leg 31 and the seal leg 33. Legs 30 and 31 may be made of metal, and are so indicated in the drawing, connection of these elements being through the flanged fitting indicated generally at 32. Seal leg 33 is preferably a length of resilient tubing, such as pure gum rubber, for example, which is friction-fitted to the discharge end of leg 31 and to nipple 36 in the bottom of header 37. It will be noted that nipple 36 is cut away longitudinally to provide a low step at level $d$, so that feed therethrough will be shielded by the higher level half-annular lip 46 adjacent filter 42 to prevent the application of direct suction of the filter to the nipple opening. Seal leg 33 is provided with clamp valve 34 to permit shut off of connection with header 37 prior to start up or during header filter changeover as hereinafter described. Header 37 is provided to interrupt the siphon flow at the critical elevation of level $d$ and to permit division of nitroglycerin flow from one siphon system to several process supply lines, only one, 43, being shown. The design of header shown in the drawing is provided with a removable top cover 40 and a sloped floor 41 to permit complete drainage of the contents by gravity flow through resilient tube 38 provided with clamp valve 47. An overflow line 39 is connected in open communication with the upper level of header 37, both of the lines 38 and 39 discharging into a fresh soda solution catch tank, which may be common with that hereinabove mentioned as the receiver for line 25. Cover 40 of header 37 is provided with a vent 44 open to the atmosphere, which vent maintains the interior of header 37 at atmospheric pressure.

Nitroglycerin may be withdrawn by gravity flow through resilient process supply line 43; however, where a filter element 42 is provided as an additional safeguard against particle carry-over it is preferred to apply suction to line 43 at some point (not shown) downstream from the header, in which case the full expanse of the filter should be above level $d$.

Auxiliary apparatus is provided to purge the siphon of any water trapped at the high point of the siphon during start-up, this constituting resilient by-pass line 55, connected to the high point of leg 30 through nipple 56 and to the aspiration connection of eductor 14, hereinbefore referred to. Eductor 14 is supplied with fresh water through line 57, and discharges into catch tank 11 through line 13. A clamp valve 58 is provided for line 55, and this valve is maintained closed at all times except when it is necessary to purge the siphon.

The relative dispositions of the intake and discharge openings of the siphon of the apparatus of this invention are important to proper operation of the device. Thus, the level $f$ at which intake 35 is disposed is preselected with respect to the level $d$ of nipple 36 so that, regardless of the respective amounts of nitroglycerin and soda wash carried in separator 20 under all conditions of operation, intake 35 will remain immersed at least to the extent of the heel indicated at level $e$. This is accomplished by choosing these two levels so that the siphon, when filled with the heaviest of the two liquids, will oppose a resistance to flow through the siphon substantially greater than that of a head of the lightest liquid equal to the distance between levels $g$ and $f$, i. e., between the decanter outlet and the siphon intake. It will be understood that once the siphon is primed with nitroglycerin, it remains primed, unless broken intentionally by the operator for purposes of equipment cleaning or maintenance. The level of nitroglycerin carried in header 37 corresponding to a level $e$ of nitroglycerin will be that of $d$, at which time no suction is imposed on the siphon due to the fact that filter 42 is then uncovered to atmospheric pressure through vent 44.

During manufacturing operations, separator 20 functions as a variable volume temporary reservoir for nitroglycerin, depending on the demand requirements of the dynamite mixing facilities supplied through line 43, and the nitroglycerin may therefore vary under normal conditions somewhere between the levels $b$ and $c$, the upper nitroglycerin level in header 37 then reaching a maximum level indicated at $a$ as a result of the balancing of hydrostatic forces between separator 20 and header 37. Where meter 50 is employed as an auxiliary, it is desirable to provide it with an alarm which apprises the operator to discontinue supply of nitroglycerin-soda water mixture through line 10 when the level of nitroglycerin attains $b$. Under these circumstances nitroglycerin cannot discharge from separator 20 to waste through draw off line 24 without the operator's knowledge. The header overflow line 39 is located at the same elevation $g$ as the inlet of line 24, hence nitroglycerin cannot overflow header 37 unless it is also overflowing through line 24.

Where meter 50 is employed as a level controller, as hereinbefore mentioned, it is desirable that it be adapted to signal the operator by a separate alarm when the nitroglycerin in the separator drops to a level, such as $c$, which might interrupt the continuity of manufacturing operations for subsequent equipment unless the operator takes measures necessary to increase the supply of mixture to separator 20. As already described, a level controlling function may be exercised by meter 50 to positively discontinue flow of nitroglycerin through line 43 by closure of valve 45 through connection 51 at a predetermined level such as that represented by $c$ or some other value. It will be understood that, regardless of whether automatic level control is utilized as hereinabove described or if such control should for any reason fail, the siphon will halt delivery completely with the retention of a minimum heel at level $e$ in separator 20 if the quantity of nitroglycerin becomes depleted to this low value, thus barring passage of impurities into header 37. However, the siphon will remain primed and in readiness for further delivery should more nitroglycerin and soda wash be fed to the separator.

In a typical apparatus built according to this invention differences in elevation, referred to the opening of intake 35 (i. e., level $f$), of 35 5/16" for the outlet opening of line 24 and 23 3/16" for level $d$ of header 37 or the discharge opening of the siphon, yielded entirely satisfactory operation during service.

At start-up, when separator 20 is empty, the separator, siphon and header are filled with fresh water by opening the flow of water through line 57 into catch tank 11. Clamp valve 34 on seal leg 33 is then closed and header 37 is drained by opening clamp valve 47, after which valve 47 is closed. The flow of nitroglycerin and soda wash is then started through line 10, whereupon the level of nitroglycerin gradually builds up in separator 20 to the lowermost point at which level controller 50 will permit delivery of product through line 43, for example, $c$. The operator then opens valve 34 and the hydrostatic pressure of the nitroglycerin to level $c$ together with the supernatant soda wash to level $g$ initiates flow of nitroglycerin through the siphon into header 37. Eductor 14 may be operated briefly by opening water flow through line 57 and opening clamp valve 58 for a short time to draw off any water which might be entrapped in the high point of the siphon by underflow of nitroglycerin at this point, after which valve 58 is closed and the eductor shut down. The siphon is now primed and remains so until broken by intentional action on the part of the operator, delivering nitroglycerin to header 37 whenever the level in separator 20 exceeds $c$ and barring delivery whenever the level falls to $c$. When no level controller is employed, the siphon will of course control to level $e$ instead of $c$.

Occasionally it becomes necessary to clean separator 20 and header 37 by flushing with fresh water. It is then desirable to remove as much of the pure nitroglycerin held up in separator 20 as practicable without, however, permitting particle impurities or soda wash to pass to the header. This is accomplished by interrupting the interlock via line 51 between meter 50 and valve 45, shutting off the supply of mixed soda wash and nitroglycerin through line 10 and opening the fresh water supply through line 57. Under the hydrostatic fresh water head built up to level $g$ within separator 20, it is possible to evacuate all nitroglycerin from the separator to level $e$, leaving the protecting heel of nitroglycerin weighing about 10 lbs. as a bar to carryover of any particles or water. The small residual amounts of nitroglycerin in the separator, siphon and header may then be dumped to the soda water catch tank by opening valves 26 and 47 and the interior surfaces of the equipment cleaned by flushing with fresh water.

It is sometimes desirable to substitute a new filter element 42 between cleaning periods and this is readily accomplished without interference with the siphon delivery action, and without breaking the siphon, by briefly closing off valve 34 in seal leg 33, permitting the level of nitroglycerin in header 37 to drop to level $d$, removing the top of the header and replacing the old filter element with a new one, after which delivery to the header is restored by opening valve 34 again.

From the foregoing, it will be understood that I have provided an overflow type decanter which is adapted to separating two immiscible liquids and at the same time preventing the carry over of contaminating particulate solids intermingled with the liquids where the density of the particulate solids is less than the density of the heaviest of the two liquids which may be modified in certain respects without departure from the essential spirit of my invention, wherefor I desire to be limited only by the scope of the following claims.

What is claimed is:

1. An apparatus for separating the liquid components and at the same time preventing the carryover of contaminating particulate solids intermingled with a mixture of two immiscible liquids in which the density of the heaviest of said two liquids exceeds the density of said particulate solids comprising in combination a continuous overflow type decantation separator provided with an inlet for the introduction of said mixture of said two immiscible liquids together with said contaminating particulate solids and an outlet opening at a level above said inlet for the draw off of the lightest of said two immiscible liquids, and a siphon having an intake opening disposed within said decantation separator at a level below said inlet and a discharge opening in communication with a header provided for reception of the heaviest of said two liquids, the difference in elevation between said intake and discharge openings being preselected to oppose a resistance to flow through said siphon when said siphon is filled with said heaviest liquid substantially greater than a head of the lightest of said two liquids equal to the distance between said intake and said outlet openings.

2. An apparatus according to claim 1 in which there is provided an evacuation means with suction side connected to the high point of said siphon to permit removal of any entrapped lightest liquid within said siphon during start-up.

3. An apparatus for separating the liquid components and at the same time preventing the carryover of contaminating particulate solids intermingled with a mixture of two immiscible liquids in which the density of the heaviest of said two liquids exceeds the density of said particulate solids comprising in combination a continuous overflow type decantation separator provided with an inlet for the introduction of said mixture of said two immiscible liquids together with said contaminating particulate solids and an outlet opening at a level above said inlet for the draw off of the lightest of said two immiscible liquids, and a siphon having an intake opening disposed within said decantation separator at a level below said inlet and a discharge opening in communication with a header provided for reception of the heaviest of said two liquids, said header being vented to the atmosphere and provided with a vacuum draw off adapted to be partially submerged by liquid delivered to said header from said decantation separator, the difference in elevation between said intake and discharge openings being preselected to oppose a resistance to flow through said siphon when said siphon is filled with said heaviest liquid substantially greater than a head of the lightest of said two liquids equal to the distance between said intake and said outlet openings and the level of said discharge opening being disposed below the level of said vacuum draw off in said header.

References Cited in the file of this patent

UNITED STATES PATENTS

| | | |
|---|---|---|
| 618,998 | Rothe | Feb. 7, 1899 |
| 889,664 | Crozier | June 2, 1908 |
| 1,115,505 | Chapin | Nov. 3, 1914 |
| 1,331,732 | Wait | Feb. 24, 1920 |
| 2,191,019 | Johnson | Feb. 20, 1940 |
| 2,604,443 | Fiffs | July 22, 1952 |